(12) United States Patent
Nacman et al.

(10) Patent No.: US 6,359,641 B1
(45) Date of Patent: Mar. 19, 2002

(54) MULTIPLE DIODE IMAGING SYSTEM INCLUDING A MULTIPLE CHANNEL BEAM MODULATION INTEGRATED CIRCUIT

(75) Inventors: Aron Nacman, Penfield; Isaak Rivshin, Pittsford, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/160,785

(22) Filed: Sep. 24, 1998

(51) Int. Cl.[7] ................................................. B41J 2/47
(52) U.S. Cl. ...................................................... 347/235
(58) Field of Search ................................. 347/233, 238, 347/248, 237, 247, 250, 252, 253, 130, 139, 235; 346/108, 160

(56) References Cited

U.S. PATENT DOCUMENTS

| | | | |
|---|---|---|---|
| 5,208,796 A | | 5/1993 | Wong et al. ................ 369/97 |
| 5,241,329 A | * | 8/1993 | Guerin ........................ 346/160 |
| 5,381,165 A | | 1/1995 | Lofthus et al. ............. 346/108 |
| 5,657,067 A | * | 8/1997 | Nagahata .................... 347/209 |
| 5,675,685 A | * | 10/1997 | Fukuda et al. ................ 385/89 |
| 5,691,759 A | * | 11/1997 | Hanson ....................... 347/233 |
| 5,808,658 A | * | 9/1998 | Hoover ....................... 347/250 |

OTHER PUBLICATIONS

"Pulse Width Modulator" product specification—Rev. 0 from Analog Devices (1996).
"Document Centre 265 Digital Copier Specifications"—Xerox Corporation (1997).

* cited by examiner

Primary Examiner—N. Le
Assistant Examiner—K. Feggins

(57) ABSTRACT

The present invention is an apparatus for digitally controlling the output of multiple laser diodes in a system that forms a plurality of scan lines in a Raster Output Scanning (ROS) system. Output of the laser diodes is digitally controlled by a multi-channel integrated circuit to eliminate propagation delay and linearity differences commonly found between single-channel modulation control devices.

17 Claims, 3 Drawing Sheets

MULTIPLE DIODE IMAGING SYSTEM INCLUDING A MULTIPLE CHANNEL BEAM MODULATION INTEGRATED CIRCUIT

This invention relates generally to a multiple-diode raster output scanning system. The system directs high intensity imaging beams toward a reflective scanning element, causing the beams to scan across a movable photoresponsive member and record latent electrostatic images thereon. More particularly, the invention relates to the use of a multi-channel integrated circuit for control of laser beams and, in turn, the exposure of the photoresponsive surface.

BACKGROUND AND SUMMARY OF THE INVENTION

In recent years, laser printers have been increasingly used to produce output copies from input video data representing original image information. Laser printers typically uses a Raster Output Scanner (ROS) to expose charged portions of the photoresponsive member to record an electrostatic latent image thereon. Generally, a ROS has a laser and associated optical components for generating a collimated beam of monochromatic radiation. The laser beam is modulated in conformance with the image information (e.g., video data). The modulated beam is reflected through a lens onto a scanning element such as a rotating polygon having mirrored facets.

The light beam is reflected from a facet of the polygon and thereafter focused to a "spot" on the photosensitive member. The rotation of the polygon causes the spot to scan across the photoresponsive member in a fast scan (i.e., line scan) direction. Meanwhile, the photoresponsive member is advanced relatively more slowly than the rate of the fast scan in a slow scan (i.e., process) direction that is orthogonal to the fast scan direction. In this way, the beam scans the recording medium in a raster (or scan line) scanning pattern. The light beam is modulated in accordance with an input image data stream at a rate such that individual picture elements ("pixels") of the image represented by the data stream are exposed on the photosensitive medium to form a latent electrostatic image. The latent image is then developed and transferred to an appropriate image receiving medium such as paper.

When using a multiple laser diode for simultaneous imaging with at least two emitted laser beams, it is very important to balance the power of the beams and modulation of the beams to provide uniform exposure of the photoresponsive member. A lack of uniformity can create image quality problems. The problems are exacerbated by the presence of both thermal crosstalk between laser diodes placed within a common package and timing differences in the electronics used to modulate the laser beams. Differences in timing between the channels used to modulate each of the beams (e.g., propagation delay), results in image defects in the developed electrostatic image (e.g., "city blocks" defects).

It is desirable to provide a multiple diode modulation control system that overcomes the timing differential difficulties observed in multiple-channel ROS systems. Two characteristics that are critical to a multi-channel ROS modulation control are channel-to-channel differential propagation delay and channel-to-channel differential linearity. Channel-to-channel differential propagation delay is measured from the rising edge of the pixel clock and is the difference between the signal level on each channel when the pulse-width and position-modulated (PWPM) pulse occurs. Channel-to-channel differential linearity is the difference between the measure of pulse width and position for the same video data input code applied to each channel, as measured over the range of video input codes.

It is therefore an object of the present invention to reduce channel-to-channel differential propagation delay and channel-to-channel differential linearity in the ROS modulation control so as to eliminate image quality defects that arise from significant timing differentials. Another object of the present invention is to reliably produce matched channel devices so as to eliminate the need to pre-sort or compensate for differential propagation delay or differential linearity in paired single-channel devices. Additionally, placing multiple PWPM channels on a common integrated circuit results in both a cost savings for the integrated circuit, and a reduction in printed wiring board space. Other advantages of the present invention will become apparent as the following description proceeds, and the features characterizing the invention will be pointed out with particularity in the claims annexed to and forming a part of this specification.

This invention is a ROS system that uses a multi-channel modulation control device, implemented with a common integrated circuit, to control the power from a multiple (preferably dual or quad) laser diode. The present invention has particular application to digital image printing and reprographic systems. The invention is believed to result in both a cost savings for such systems and improved image quality relative to conventional dual diode ROSs.

In accordance with the present invention, there is provided a raster imaging system for exposing a photoresponsive surface moving relative to the raster imaging system in a process direction, including: a multi-beam laser diode scanner forming a plurality of rasters across said surface, in a direction transverse to the process direction, by reflecting and modulating a plurality of beams so as to direct the beams to the photoresponsive surface; a controller to control the power from the multi-beam laser diode, said controller including, means to control, individually, the exposure level from each of the plurality of laser diodes by controlling the laser diode current; and a multi-channel beam modulation controller, providing video signals to each of the multi-beam lasers, wherein the multi-channel beam modulation controller is implemented in a single integrated circuit package.

In accordance with another aspect of the present invention, there is provided a printing system for forming multiple image exposure frames on a photoresponsive surface moving in a process direction and subsequently developing an transferring the developed images to a printable medium, including: a multiple beam raster output scanner forming a plurality of scan lines in a transverse direction across a width of the member by reflecting modulated beams from a plurality of facets of a rotating polygon, wherein the raster output scanner employs a multi-beam laser diode; means for detecting the beginning of a scan line as a modulated beam traverses a start-of-scan position and providing a start of scan (SOS) signal representing the detection, wherein the SOS signal is subsequently used to synchronize the rotation of the rotating polygon with movement of the photoresponsive surface; a controller to control the power from the multi-beam laser diode, said controller including, means to control, individually, the exposure level from each of the plurality of laser diodes by controlling the laser diode current; and a multi-channel beam modulation controller, providing video signals to each of the multi-beam lasers, wherein the multi-channel beam modulation controller is implemented in a single integrated circuit package One aspect of the invention is based on the ability to place multiple channel modulation control (PWPM or high-addressability) on a single integrated circuit device. The system described herein is advantageous because it is efficient and inexpensive compared to other approaches, and eliminates a substantial source of image quality defects in multi-channel, multi-beam raster output scanning systems.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims. In particular, a dual-channel embodiment will be described however, the intent is to cover aspects of multi-channel devices.

DESCRIPTION OF THE PREFERRED EMBODIMENT

Figure 1:
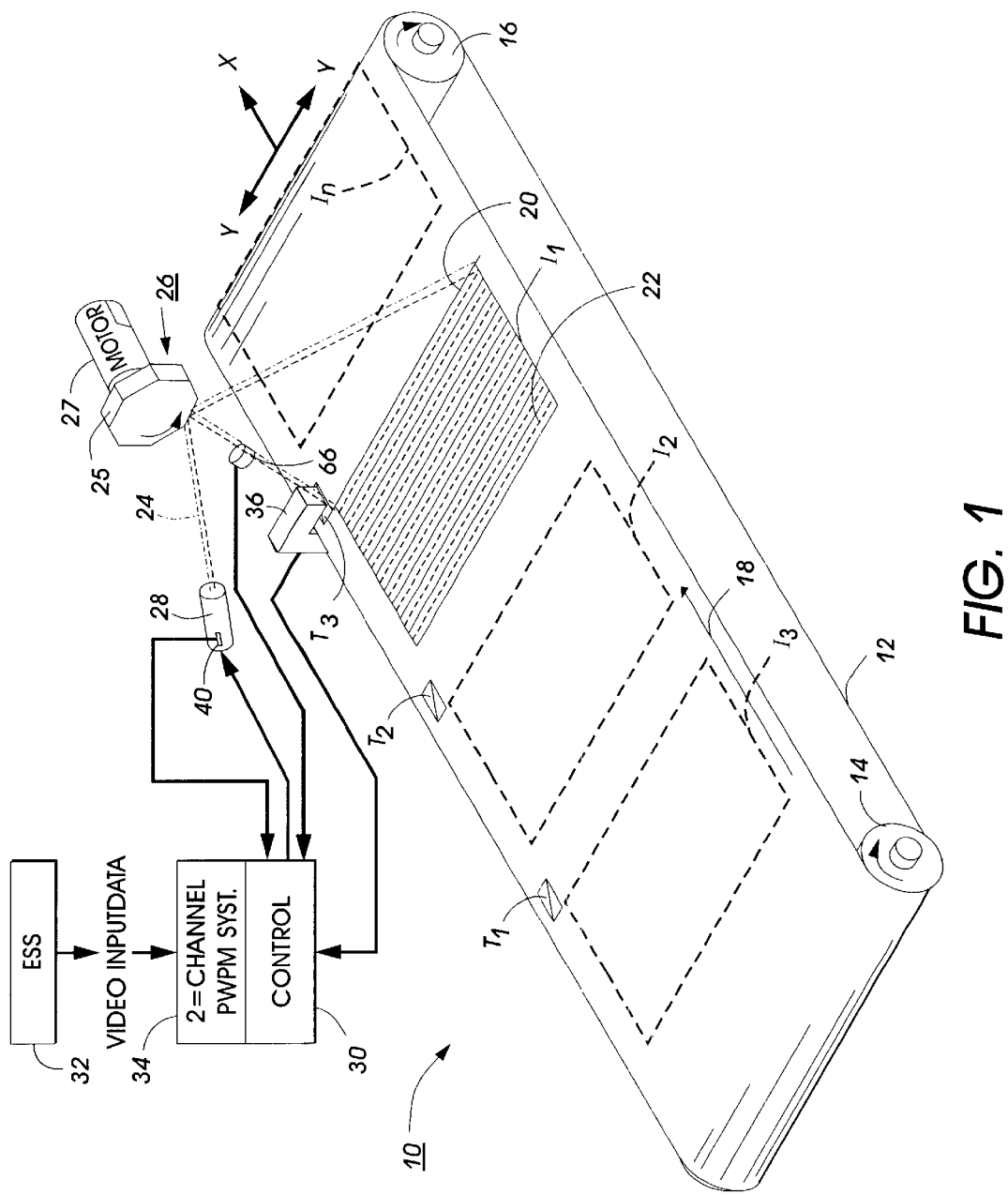
FIG. 1 illustrates a ROS printing system incorporating dual beam lasers in accordance with the present invention.

FIG. 1 of the drawings schematically depicts an embodiment of the present invention incorporated in a multi-pass xerographic printing system and designated generally by reference numeral 10. The system 10 includes a photoresponsive belt 12 (photoreceptor) entrained about guide rollers 14 and 16, at least one of which is driven to advance the belt in a longitudinal direction of travel depicted by arrow 18. The length of the belt 12 is designed to accept an integral number of spaced image areas $I_1-I_n$ represented by dashed line rectangles in FIG. 1. As each of the image areas $I_1-I_n$ reaches a transverse line of scan, represented at 20, it is progressively exposed on closely spaced transverse raster lines 22 shown with exaggerated longitudinal spacing on the image area $I_1$.

In the embodiment depicted in FIG. 1, the lines 20 are scanned by a raster output scanner by a pair of modulated laser beams 24 reflected to the lines by successive facets 25 on a rotatable polygon-shaped mirror 26, driven by motor 27 providing suitable feedback signals to laser control 30. The beams 24, illustrated in dotted lines, are emitted by a laser device 28 such as a dual beam laser diode. The dual beam laser diode is operated by a laser drive module and power control sub-system forming part of a laser control processor generally designated by the reference numeral 30. The processor 30 includes other circuitry or logic modules (not shown) such as a scanner drive command circuit, by which operation of motor 27 for rotating the polygon mirror 26 is controlled. A detailed description of an exemplary laser control processor is found in U.S. patent application Ser. No. 09/004,095 to Melino et al (filed Jan. 7, 1998), the relevant portions of which are hereby incorporated by reference.

A start-of-scan (SOS) detector, illustrated at 66, determines a start-of-scan reference point and also provides suitable feedback signals to laser control processor 30. SOS detector 66 may be implemented using an optical fiber to receive the laser beam at a SOS position and to transmit the beam to a photodetector spaced apart from the SOS position. In addition, a laser power sensor 40, also referred to as a back facet photodiode, senses a portion of the power of laser 28 (beam intensity) to convey a power reading to laser control 30.

In the operation of the system 10, as thus far described, the control 30 responds to a pulse-width and position-modulated video signal to expose each raster line 22 of a linear segment of the video signal image. In xerographic color systems, each image area $I_1-I_n$, is preferably exposed in the same manner for four successive exposures, one for each of the three primary colors (cyan, magenta, yellow) and black. In a multi-pass system such as the system 10, where only one raster output scanner or head is used, complete exposure of each image area requires four revolutions of the belt 12. It should also be noted that the present invention is equally applicable to other exposure systems (including single color or multi-color image-on-image systems).

The image areas $I_1-I_n$ are successively exposed on successive raster lines 22 as each raster line registers with a transverse scan line 20 as a result of longitudinal movement of the belt 12. It is to be noted that the length of the transverse scan line 20 in system 10 is longer than the transverse dimension of the image areas I. Scan line length, in this respect, is determined by the length of each mirror facet 25 and exceeds the length of the raster lines 22. The length of each raster line is determined by the time during which the laser diode is active to reflect the modulated beams from each facet 25 on the rotating polygon 26; the active period being determined by the laser drive module in response to the PWPM video signal. Thus, the active portion of each transverse scan line may be shifted in a transverse direction by control of the laser drive module, and the transverse position of the exposed raster lines 22, and image areas $I_1-I_n$, shifted in relation to the belt 12. Downstream from the exposure station, a development station (not shown) develops the latent image formed in the preceding image area. After the last color exposure, a fully developed color image is then transferred to an output sheet.

Electronic Sub System (ESS) 32 contains the circuit and logic modules that are employed to generate input video data signals and other control and timing signals (not shown), to drive the photoresponsive belt 17 synchronously with the image exposure and to control the rotation of the polygon by the motor. For further details, reference is made to U.S. Pat. Nos. 5,381,165 and 5,208,796 which are hereby incorporated by reference. As illustrated any suitable marker on the photoresponsive surface or belt or any suitable hole such as T1, T2, and T3 provides a reference for the registration of each projected image on the belt surface.

Figure 2:
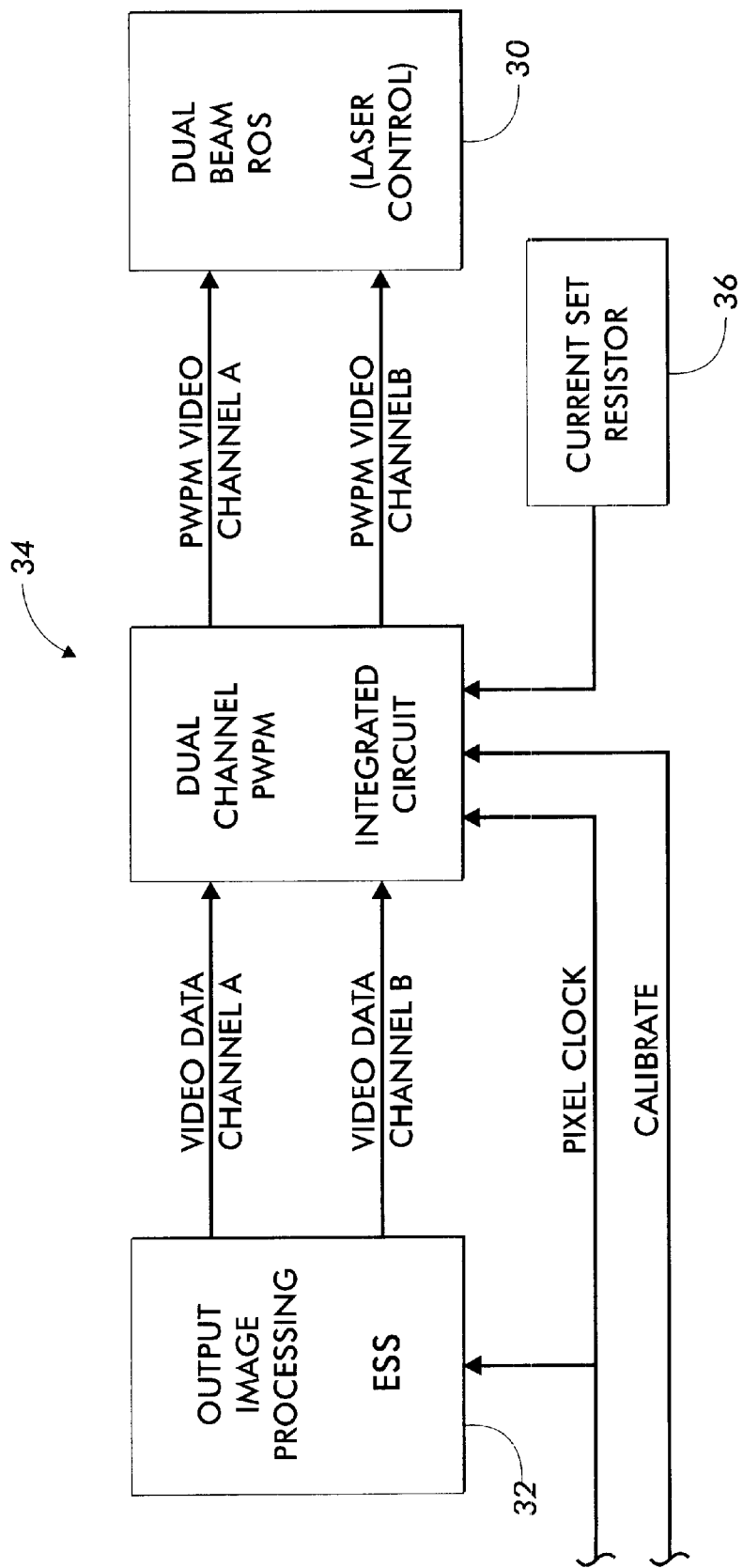
FIG. 2 is a block diagram of a dual channel pulse-with position-modulated control system in accordance with the present invention.

The output of ESS 32, as will be described in further detail with respect to FIG. 2, is video data that is passed to a dual channel PWPM subsystem 34 (or a high-addressability laser control device subsystem, as discussed below). As is well-known in PMPW exposure systems, the video data is preferably converted to a pulse-width and position-modulated video signal capable of driving the on-off state of an associated laser beam. In the present embodiment, the PWPM output is suitable for specifying the location and duration of the video pulse for each pixel period. More specifically, a multi-bit signal is produced that specifies one of a plurality of pulse positions (e.g., left, right or center) and a pulse duration. For example, a 10-bit signal would employ 2 bits for specifying the position and 8 bits for the duration in increments of 1/256. Although not specifically illustrated, it is conceivable that the present invention may also be implemented using a high-addressability laser control device in place of PWPM output. In such systems, the video signal output by subsystem 34 would be a high-addressability signal specifying the ON/OFF state of the associated laser beam for each of a plurality of sub-pixel positions within a larger pixel period.

In accordance with a preferred embodiment, a micro-controller (not shown) controls a dual beam laser diode with multiple control loops in a shared, time multiplexed mode. The same micro-controller is also employed within the Motor Polygon Assembly (MPA) speed control (not shown) and other sub-system applications such as soft start ramping of lasers and diagnostics of laser failures with controlled ROS shutdowns. The micro-controller generates sample timing, logic sequencing of video overrides and Level control loop selections in order to acquire the sampled power data for each of the four power control loops. A power sample is taken between each scan line during the rescan time (time between the end of one scan line to the beginning of the next scan line.). This critical one sample per scan timing is generated by high speed capture and compare event timing also done by the micro-controller internally to implement an independent stand alone sub-system operation with simplified video interface that has been reduced to two channel video inputs and SOS pulse output.

With respect to FIG. 2, there is shown a block diagram of the dual channel PWPM subsystem 34. In the subsystem each channel, A and B, receives the respective video data output from an image processing source such as ESS 32. In accordance with well-known integrated circuit design techniques, each of the channels of the dual channel PWPM subsystem 34 are designed to process the video data and generate a PWPM video signal. More specifically, each of the multiple channels is incorporated on an integrated circuit and designed to have approximately equivalent performance characteristics for each channel.

It is well-known to produce pulse width modulators having a single-channel in an integrated circuit. An example of such a device is Analog Devices AD9561 pulse width modulator as described in the Product Specification—Rev. 0, 1996, hereby incorporated by reference for its teachings.

A preferred embodiment requires that the channel-to-channel differential propagation delay must be on the order of less than ±1 nanosecond (ns). Similarly, in a preferred subsystem, the channel-to-channel differential linearity is also on the order of less than ±1 ns. Moreover, it is important, from a performance perspective, that both of these specifications are met over a range of operating temperatures as well as while the PWPM integrated circuit ages.

In addition to the specifications mentioned above a PWPM integrated circuit requires a current set resistor. In the preferred embodiment a common current set resistor 36 is employed by the integrated circuit so that each of the multiple channels may be more closely matched. Use of a common current set resistor eliminates the need to closely match the tolerances of plural current set resistors (e.g., 0.5% tolerance to assure no more than 1% difference between the resistors). Thus, the common current set resistor produces a current that is used as a reference by all PWPM functions.

Figure 3:
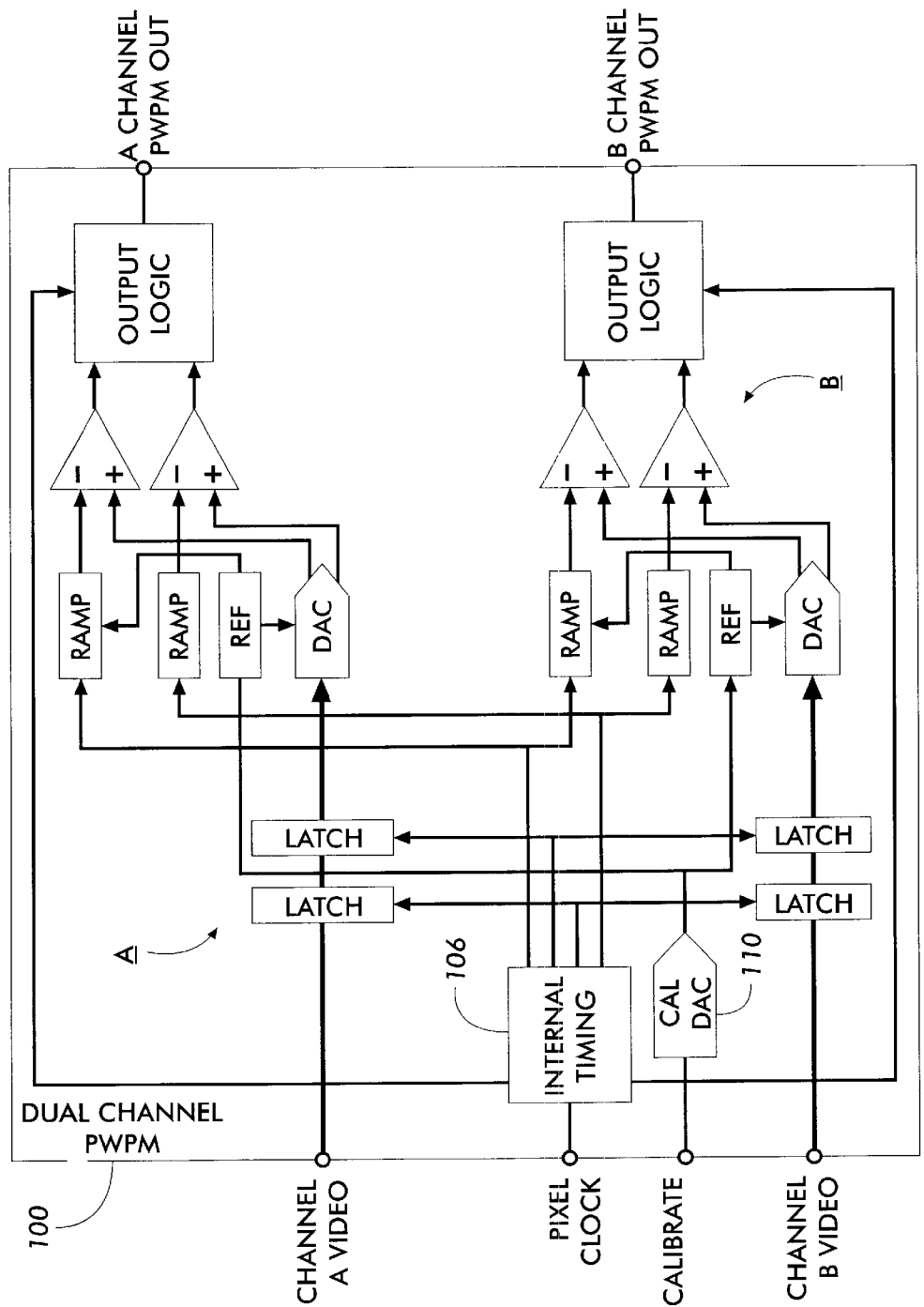
FIG. 3 is a functional block diagram of a dual channel pulse-width modulator as employed in a dual-diode raster output scanner.

In a preferred embodiment, as presently employed, for example in an Analog Devices integrated circuit used in the Xerox Document Centre 265, and as generally represented by the functional block diagram of FIG. 3, the dual channel integrated circuit has each of the multiple channel circuits formed on a common silicon substrate 100. Use of the common substrate eliminates mismatches in performance arising from silicon substrate manufacturing. Similarly, because the channels are formed on a common substrate, redundant circuits (e.g., internal timing 106 and calibration Digital-to-Analog converter 110) and control logic (not shown) were minimized. More specifically, the preferred circuit employs a single pixel clock input to begin and end each PWPM cycle (or each pixel period in a high-addressability embodiment). Similarly, a common calibration circuit, CAL DAC 110, is employed on the integrated circuit so that calibration of the subsystem will be more accurate than single channel integrated circuits where each device has its own calibration circuit. It will be appreciated by those skilled in the art of integrated circuit design that four or more pulse-width modulation channels may be incorporated on a single integrated circuit device.

In recapitulation, the present invention is an apparatus for the accurate control of the modulated output of a multiple laser diode system. In particular, the system employs a multiple channel pulse-width and position-modulated control subsystem and thereby accurately controls the modulation of each of the multiple laser diodes, to provide channel-to-channel differential ranges that are within tight tolerances.

It is, therefore, apparent that there has been provided, in accordance with the present invention, a ROS-based digital printing system having an apparatus for accurate control of the modulation of each of a plurality of laser diodes. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A raster imaging system for exposing a photoresponsive surface moving relative to the raster imaging system in a process direction, including:
    a multi-beam laser diode scanner forming a plurality of rasters across said surface, in a direction transverse to the process direction, by reflecting and modulating a plurality of beams so as to direct the beams to the photoresponsive surface;
    a controller to control the power from the multi-beam laser diode, said controller including, means to control, individually, the exposure level from each of the plurality of laser diodes by controlling the laser diode current; and
    said controller including a multi-channel beam modulation controller, providing video signals to each of the multi-beam lasers, wherein the multi-channel beam modulation controller is implemented in a single integrated circuit package.

2. The raster imaging system of claim 1, wherein the multi-channel beam modulation controller is a pulse-width position modulated controller suitable for driving each of the multi-beam lasers.

3. The raster imaging system of claim 2, wherein the multi-channel beam modulation controller uses a single current set resistor.

4. The raster imaging system of claim 2, wherein each channel of the multi-channel beam modulation controller employs a common pixel clock.

5. The raster imaging system of claim 2, wherein each channel of the multi-channel beam modulation controller uses a common calibration circuit.

6. The raster imaging system of claim 2, wherein the channel-to-channel differential propagation delay is less than ±1 nanosecond.

7. The raster imaging system of claim 2, wherein the channel-to-channel differential linearity is less than ±1 nanosecond.

8. The raster imaging system of claim 1, wherein the multi-channel beam modulation controller is a high-addressability controller suitable for driving each of the multi-beam lasers.

9. A printing system for forming multiple image exposure frames on a photoresponsive surface moving in a process direction and subsequently developing and transferring the developed images to a printable medium, including:

a multiple beam raster output scanner forming a plurality of scan lines in a transverse direction across a width of the member by reflecting modulated beams from a plurality of facets of a rotating polygon, wherein the raster output scanner employs a multi-beam laser diode;

means for detecting the beginning of a scan line as a modulated beam traverses a start-of-scan position and providing a start of scan (SOS) signal representing the detection, wherein the SOS signal is subsequently used to synchronize the rotation of the rotating polygon with movement of the photoresponsive surface;

a controller to control the power from the multi-beam laser diode, said controller including, means to control, individually, the exposure level from each of the plurality of laser diodes by controlling the laser diode current; and said controller including a multi-channel beam modulation controller, providing video signals to each of the multi-beam lasers, wherein the multi-channel beam modulation controller is implemented in a single integrated circuit package.

10. The printing system of claim 9, wherein the multi-channel beam modulation controller is a pulse-width position modulated controller suitable for driving each of the multi-beam laser diodes.

11. The printing system of claim 9, wherein the multi-channel beam modulation controller uses a single current set resistor.

12. The printing system of claim 9, wherein each channel of the multi-channel beam modulation controller employs a common pixel clock.

13. The printing system of claim 9, wherein each channel of the multi-channel beam modulation controller uses a common calibration circuit.

14. The printing system of claim 9, wherein channel-to-channel differential propagation delay is less than ±1 nanosecond.

15. The printing system of claim 9, wherein channel-to-channel differential linearity is less than ±1 nanosecond.

16. The printing system of claim 9, wherein the multiple exposure frames are comprised of a plurality of different color separations superimposed on one another to produce a multiple color image.

17. The raster imaging system of claim 9, wherein the multi-channel beam modulation controller is a high-addressability controller suitable for driving each of the multi-beam lasers.

* * * * *